Dec. 5, 1939.                G. B. BENTZ                 2,182,532
                    PEDICURE ACCESSORY FOR BATHTUBS
                    Filed Aug. 8, 1938         3 Sheets-Sheet 1
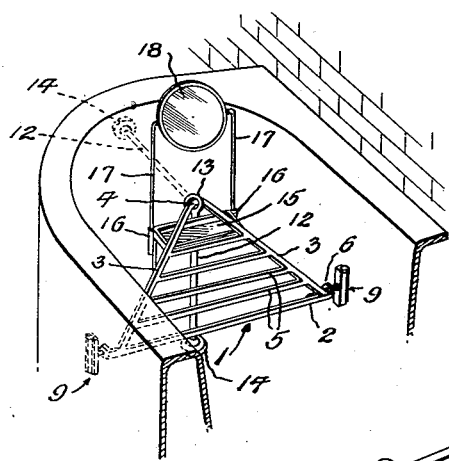
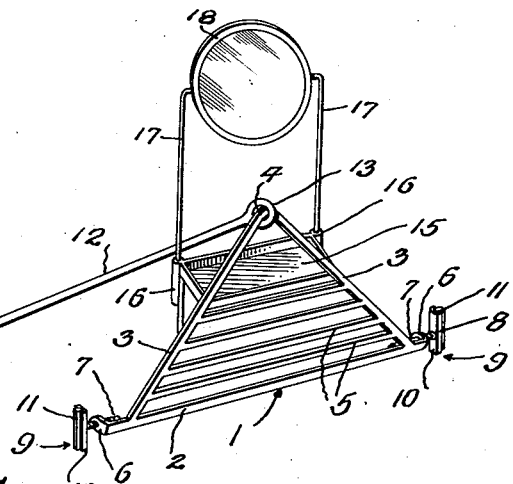
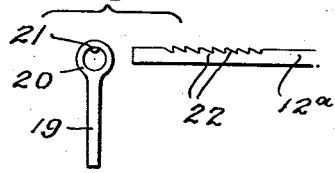
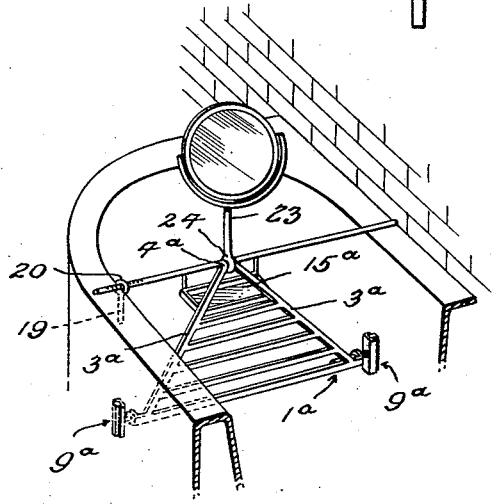
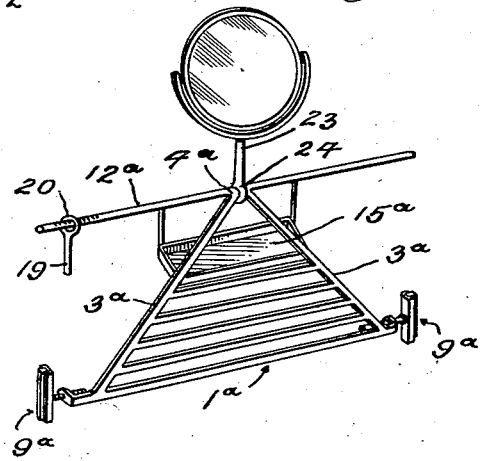
Inventor
George B. Bentz Dec. 5, 1939. G. B. BENTZ 2,182,532
PEDICURE ACCESSORY FOR BATHTUBS
Filed Aug. 8, 1938   3 Sheets—Sheet 2
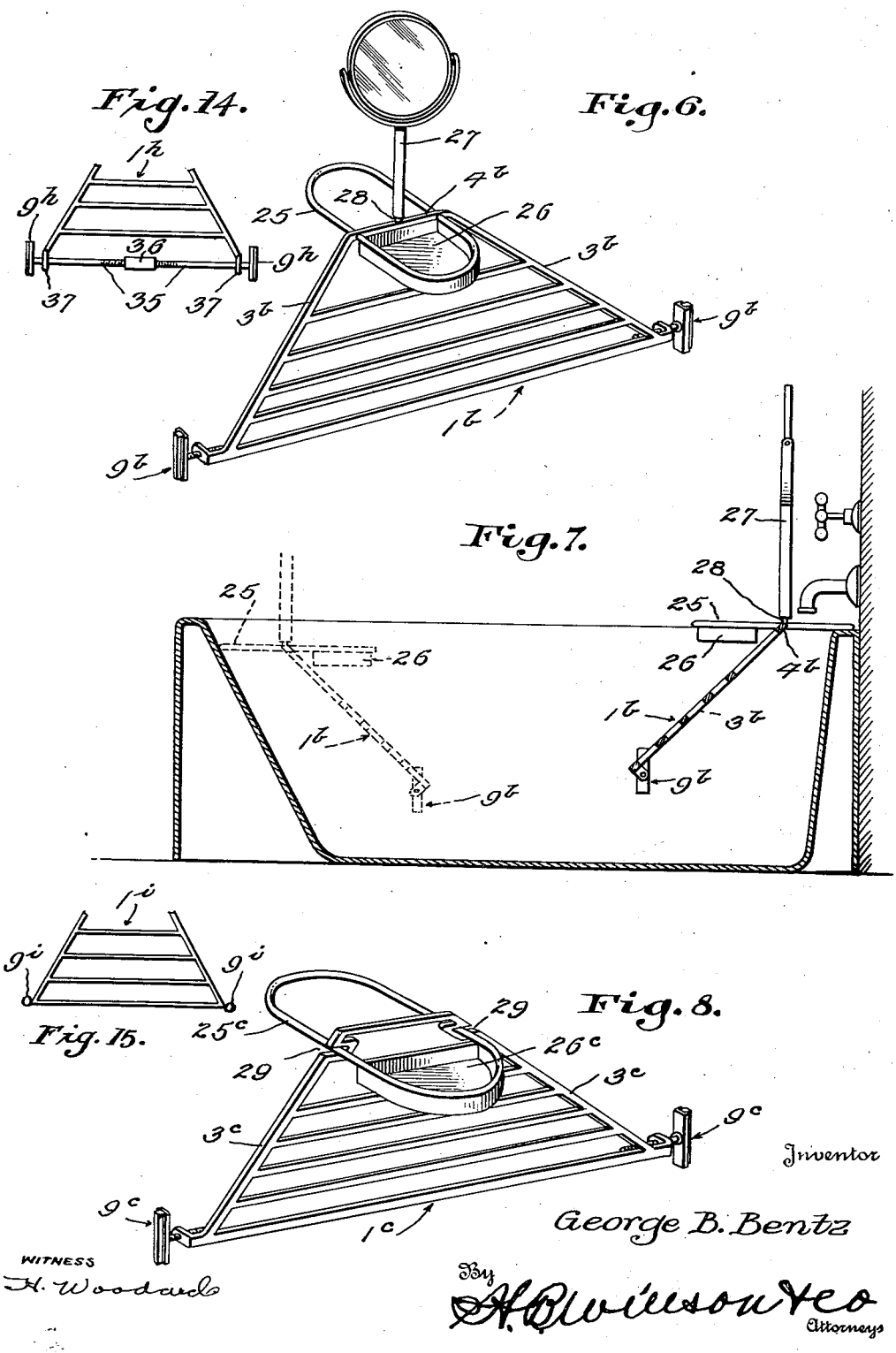

Dec. 5, 1939.　　　　　G. B. BENTZ　　　　　2,182,532
PEDICURE ACCESSORY FOR BATHTUBS
Filed Aug. 8, 1938　　　3 Sheets-Sheet 3
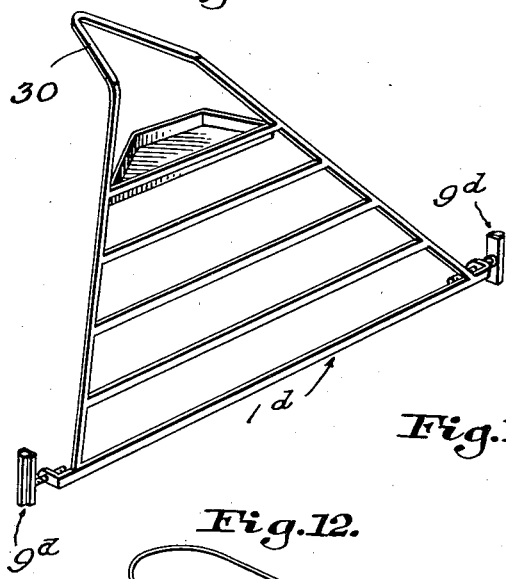
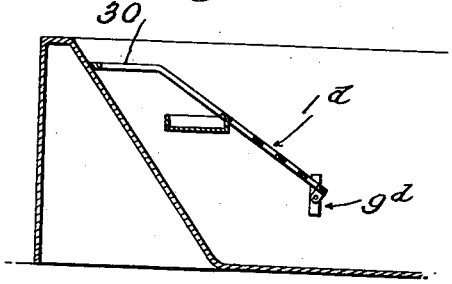
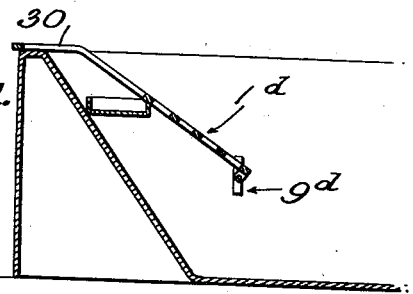
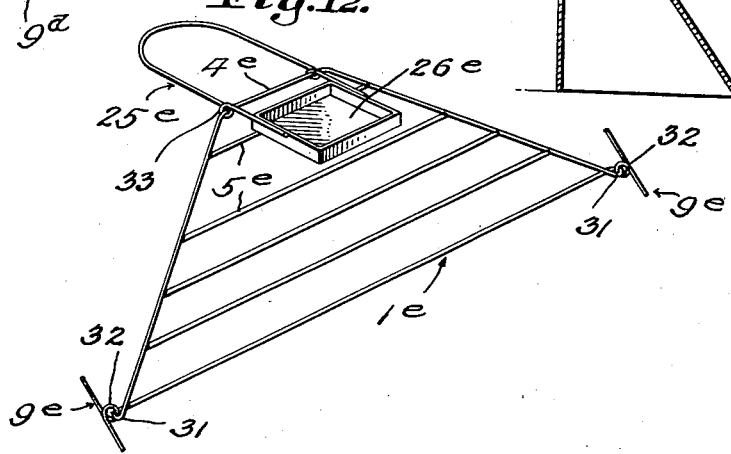
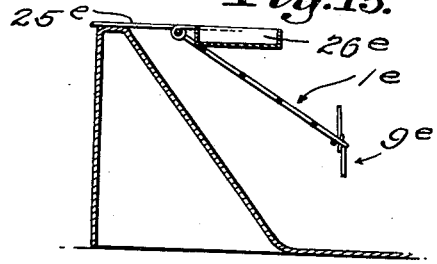
Inventor
George B. Bentz
By H. B. Wilson Yeo
Attorneys Patented Dec. 5, 1939

2,182,532

UNITED STATES PATENT OFFICE 2,182,532

PEDICURE ACCESSORY FOR BATHTUBS

George B. Bentz, Bronx, N. Y.

Application August 8, 1938, Serial No. 223,738

11 Claims. (Cl. 4—185)

The invention aims to provide a simple and inexpensive device which may be quickly and easily placed in a convenient position within a bathtub to support the user's feet while sitting in the tub, for pedicure or similar purposes.

With the foregoing in view, the invention resides in the novel subject matter hereinafter described and claimed, description being accomplished by reference to the accompanying drawings.

Figs. 1 and 2 are perspective views showing one form of the invention, the device being shown within the tub in Fig. 1.

Figs. 3 and 4 are views similar to Figs. 1 and 2 but showing a different form of construction.

Fig. 5 is an elevation illustrating a detail embodied in Figs. 3 and 4.

Fig. 6 is a perspective view showing still another form of construction.

Fig. 7 is a sectional view cut longitudinally through a bathtub, showing the device of Fig. 6 in one position in full lines and in another position in dotted lines.

Fig. 8 is a perspective view showing a form of construction somewhat different from that shown in Fig. 6.

Fig. 9 is a perspective view showing yet another form of construction.

Figs. 10 and 11 are detail sectional views showing two different ways of positioning the device of Fig. 9 for use.

Fig. 12 is a perspective view showing a construction formed principally from bent wire.

Fig. 13 is a detail sectional view showing the device in Fig. 12 positioned for use.

Figs. 14 and 15 are elevations of the lower ends of foot-rests showing further variations in construction.

Preferred features of construction have been illustrated in the drawings and will be specifically described, with the understanding, however, that within the scope of the invention as claimed, variations may be made.

In Figs. 1 and 2, a foot-rest 1 is shown for disposition in an inclined plane extending transversely within a bathtub, said foot-rest being provided with a horizontal base bar 2, with two side bars 3 which converge upwardly from the ends of said base bar and are joined to each other at their upper ends as at 4, and a plurality of rods or the like 5 extending between and secured to said side bars 3. In the present showing, the ends of the base bar 2 are provided with lateral lugs 6 through which screws 7 are adjustably threaded, said screws being connected by ball joints or the like 8 with anti-slip supporting members 9, which members are adapted to abut opposite side walls of a bathtub as shown in Fig. 1. Each member 9 preferably includes a channel 10 and a rubber strip 11 held in said channel and projecting therefrom to abut the tub.

To operatively support the upper end of the foot-rest 1, an elongated leg 12 is provided, said leg having an eye 13 at one end pivotally surrounding the joined upper ends 4 of the side bars 3. The other end of the arm 12 is provided with a rubber foot or the like 14 to either rest upon the tub bottom or to abut one end wall of the tub. By adjusting the supporting members 9 outwardly or inwardly, the lower end of the foot-rest 1 may be supported at one elevation or another, it being remembered that the tub is wider toward the top than toward the bottom, so that with said members 9 a relatively great distance from each other, the foot-rest will not extend as far in the tub as if said members 9 be adjusted into closer relation.

Rigidly secured to and projecting forwardly from the marginal frame of the foot-rest 1, is a tray 15 for holding pedicure implements and the like, the front part of said tray being provided with vertical sockets 16 receiving vertical rods 17 which carry an appropriate mirror 18, permitting the user of the tub to readily see the soles of his feet in a convenient manner.

In Figs. 3 and 4, the foot-rest 1ª and its anti-slip lower supports 9ª are practically identical with the corresponding parts of Figs. 1 and 2, and the same is true of the tray 15ª. However, instead of providing the pivoted leg 12, I provide a horizontal rod 12ª which is centrally joined to the joined upper ends 4ª of the foot-rest side bars 3ª. The end portions of the bars or rods 12ª are adapted to rest upon the rim of the bathtub as seen in Fig. 3, and one or more downwardly projecting arms 19 may be adjustably mounted on said bar or rod 12ª to abut the tub side wall or walls and hold said bar or rod against endwise movement. In the present showing, one end of the rod 12ª abuts the usual tile or the like at the inner side of the bathtub, and said rod is therefore provided only with one of the arms 19. For adjustably mounting this arm on the rod 12ª, I have shown said arm provided with an eye 20 slidable upon said rod, said eye being formed with an internal tooth 21 to engage the spaced teeth 22 on said rod 12ª, thereby holding the arm 19 in any desired position.

In the device shown in Figs. 3 and 4, a mirror support 23 is provided having an eye 24 surrounding the joined portions of the rod 12ª and the foot-rest.

In Figs. 6 and 7, the foot-rest 1ᵇ is very similar to the foot-rest 1 and its lower supports 9ᵇ may be duplicates of the supports 9. The upwardly converging side bars 3ᵇ of the foot-rest frame, however, instead of converging upwardly to a point, converge to a short horizontal top bar 4ᵇ. A horizontally elongated frame 25 extends across and is secured between its ends to this bar 4ᵇ, said frame 25 extending both forwardly and rearwardly from the upper end of the inclined foot-rest 1ᵇ. The forwardly projecting portion of the frame 25 is adapted to either rest upon a tub rim as seen in full lines in Fig. 7, or to abut one end wall of the tub as seen in dotted lines in said view. When the device is disposed at the faucet end of the tub, the loop shape of the forwardly projecting end of the frame 25, insures that this frame shall not be struck by the stream of water discharged from the faucet, preventing splashing.

The rearwardly projecting portion of the frame 25 is provided with a suitable tray 26 for pedicure implements and the like, and a suitable mirror support 27 may also be provided. In the present showing, this support is tubular and its lower end receives an upwardly projecting pin 28 on the top bar 4ᵇ of the foot-rest 1ᵇ.

In Fig. 8, the foot-rest 1ᶜ is very similar to the foot-rest 1ᵇ shown in Figs. 6 and 7, and its lower supports 9ᶜ are the same as above described. The upwardly converging side bars 3ᶜ of the foot-rest frame, however, are provided with notches 29 near their upper ends, which notches open toward the opposite side walls of the tub. These notches receive the side bars of a frame 25ᶜ when the device is in use, as seen in Fig. 8, and canting of the foot-rest 1ᶜ will cause the opposite sides of the notches 29 to bite and anti-slippingly bind against said side bars of said frame 25ᶜ. The front portion of this frame preferably lies upon the tub rim and when so doing at the faucet end of the tub, the water may readily run through the frame from the faucet, due to the loop shape. The rearwardly projecting portion of the frame 25ᶜ carries a tray 26ᶜ.

In Figs. 9, 10 and 11, a foot-rest 1ᵈ is shown very similar to the foot-rest 1 but preferably somewhat taller. The lower corners of this foot-rest are provided with supports 9ᵈ which may be identical with those above described. The upper pointed end 30 of the foot-rest frame, however, instead of being supported in any of the ways previously described, is bent to a horizontal position to either rest upon a tub rim as shown in Fig. 11, or to contact with one end wall of the tub as seen in Fig. 10.

In Figs. 12 and 13, the foot-rest 1ᵉ is constructed similarly to the foot-rest 1 but is preferably formed from heavy wire, being provided at its lower corners with eyes 31. The lower supports 9ᵉ are also formed from lengths of wire bent between their ends to form eyes 32 which are pivotally engaged with the eyes 31. A frame 25ᵉ corresponding to the frame 25 and carrying the tray 26ᵉ, is formed from wire, the side bars of said frame being provided between their ends with coils 33 which engage the top bar 4ᵉ of the foot-rest 1ᵉ, permitting the frame 25ᵉ to swing substantially into the plane of the foot-rest when the device is not in use. When the device is operatively positioned, the lower side of the tray 26ᵉ rests upon one of the horizontal wires or rods 5ᵉ of the foot-rest 1ᵉ, and the front end of the frame 25ᵉ may then either rest upon the rim of the tub or contact with the inner side of one end wall of said tub.

If desired, any one of the foot-rests 1, 1ª, 1ᵇ, 1ᶜ, 1ᵈ and 1ᵉ may have its lower end constructed as seen in Fig. 14, or as seen in Fig. 15. In Fig. 14, the rest 1ʰ is provided with two alined rods 35 adjustably connected at their inner ends by a turn-buckle 36, said rods being provided at their outer ends with tub-abutting members 9ʰ. The foot-rest 1ʰ is provided with eyes 37 through which these rods pass slidably. In Fig. 15 the foot-rest 1ⁱ is provided with two non-adjustable tub-abutting members 9ⁱ.

From the foregoing, taken in connection with the accompanying drawings, it will be seen that novel and advantageous provision has been made for carrying out the objects of the invention, and while preferred details have been disclosed, attention is again invited to the possibility of making variations within the scope of the invention as claimed.

I claim:

1. A bathtub accessory comprising a foot-rest for disposition in an inclined plane extending transversely of a bathtub, laterally adjustable supporting feet on the lower end of said foot-rest to abut the side walls of the tub, additional supporting means connected with the upper central portion of said foot-rest to contact with the tub, and a small tray also connected with said upper end of said foot-rest to hold pedicure implements.

2. A bathtub accessory comprising a foot-rest for disposition in an inclined plane extending transversely of a bathtub, said foot-rest being gradually decreased in width from its lower to its upper end, laterally adjustable supporting feet on the lower end of said foot-rest to abut the side walls of the tub, additional supporting means connected with the narrowed upper end of said foot-rest to contact with the tub, and a small tray also connected with said narrowed upper end of said foot-rest to hold pedicure implements, the width of said tray being considerably less than the width of the lower end of the foot-rest.

3. A bathtub accessory comprising a foot-rest for disposition in an inclined plane extending transversely of a bathtub, the lower end of said foot-rest being provided with anti-slip supporting means to contact with the tub, and a horizontal rod secured to the upper end of said foot-rest to lie upon the tub rim.

4. A bathtub accessory comprising a frame for disposition in an inclined plane extending transversely within a bathtub, said frame being provided with a horizontal base bar and two side bars joined to the ends of said base bar and converging upwardly, the upper ends of said side bars being joined to each other, foot-supporting means for the user's feet extending between said side bars and secured thereto, anti-slip supporting means on the lower end of said frame to contact with the tub, and a horizontal rod centrally secured to the joined upper ends of said side bars to rest upon the tub rim.

5. A structure as specified in claim 3; together with at least one arm projecting downwardly from and adjustable along said rod to abut the tub wall and prevent endwise sliding of said rod.

6. A bathtub accessory comprising a foot-rest for disposition in an inclined plane extending transversely within a bathtub, the upper end of said foot-rest being provided with a horizontally disposed rigid loop for contact with the tub at the faucet end of the tub, said loop being centrally disposed and of sufficient size to permit the water from the faucet to run through the loop without striking the same.

7. A bathtub accessory comprising a foot-rest for disposition in an inclined plane extending transversely within a bathtub, a rigid horizontal frame connected to the upper end of said foot-rest and projecting both forwardly and rearwardly therefrom, the forwardly projecting portion of said frame being constructed to contact with the faucet end of the tub in a position to clear the stream of water discharged from the faucet, and a tray carried by the rearwardly projecting portion of said frame.

8. A bathtub accessory comprising a foot-rest for disposition in an inclined plane extending transversely within a bathtub, the upper end of said foot-rest being provided with a horizontally disposed forwardly projecting member rigidly secured to said foot-rest to contact with the tub and assist in holding said foot-rest in operative position.

9. A structure as specified in claim 8; said forwardly projecting member being in the form of a loop to clear the stream of water discharged from the tub faucet if disposed against the faucet end of the tub.

10. A bathtub accessory comprising a foot-rest for disposition in an inclined plane extending transversely within a bathtub, said foot-rest having a narrowed upper end formed with notches opening toward the tub side walls, and a horizontally elongated frame having side bars received in said notches, said frame being removable from said foot-rest by horizontally turning said frame until said side bars clear said notches, the front portion of said frame which normally projects forwardly from said foot-rest being adapted to contact with the tub and assist in holding said foot-rest in operative position.

11. A structure as specified in claim 10; the rear portion of said frame which normally projects rearwardly from said foot-rest being provided with a tray.

GEORGE B. BENTZ.